March 9, 1926.

A. W. KATH 1,576,480

CLIP ATTACHING MACHINE

Filed Sept. 19, 1924

7 Sheets-Sheet 1

INVENTOR.
Alfred W. Kath
BY Edward N. Pagelsen
ATTORNEY.

March 9, 1926.

A. W. KATH 1,576,480

CLIP ATTACHING MACHINE

Filed Sept. 19, 1924     7 Sheets-Sheet 2

INVENTOR.
Alfred W. Kath
BY
Edward N. Pagelsen
ATTORNEY.

March 9, 1926.

A. W. KATH 1,576,480

CLIP ATTACHING MACHINE

Filed Sept. 19, 1924      7 Sheets-Sheet 3.

INVENTOR.
Alfred W. Kath
BY Edward N. Pagelsen,
ATTORNEY.

March 9, 1926.

A. W. KATH

CLIP ATTACHING MACHINE

Filed Sept. 19, 1924

1,576,480

7 Sheets-Sheet 5

INVENTOR.
Alfred W. Kath
BY
Edward N. Pagelsen
ATTORNEY.

March 9, 1926.
A. W. KATH
1,576,480
CLIP ATTACHING MACHINE
Filed Sept. 19, 1924  7 Sheets-Sheet 6
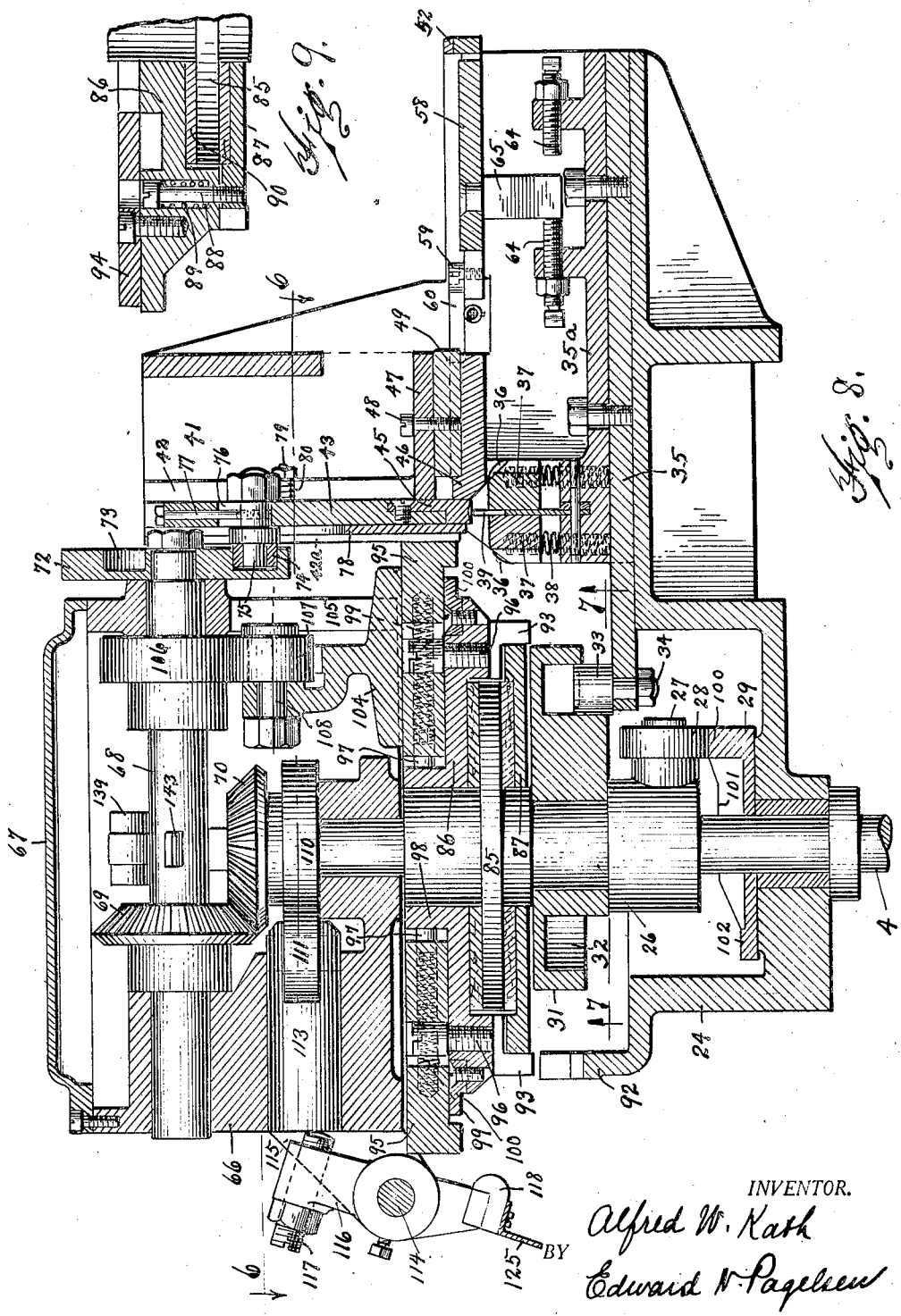
INVENTOR.
Alfred W. Kath
BY Edward N. Pagelsen
ATTORNEY.

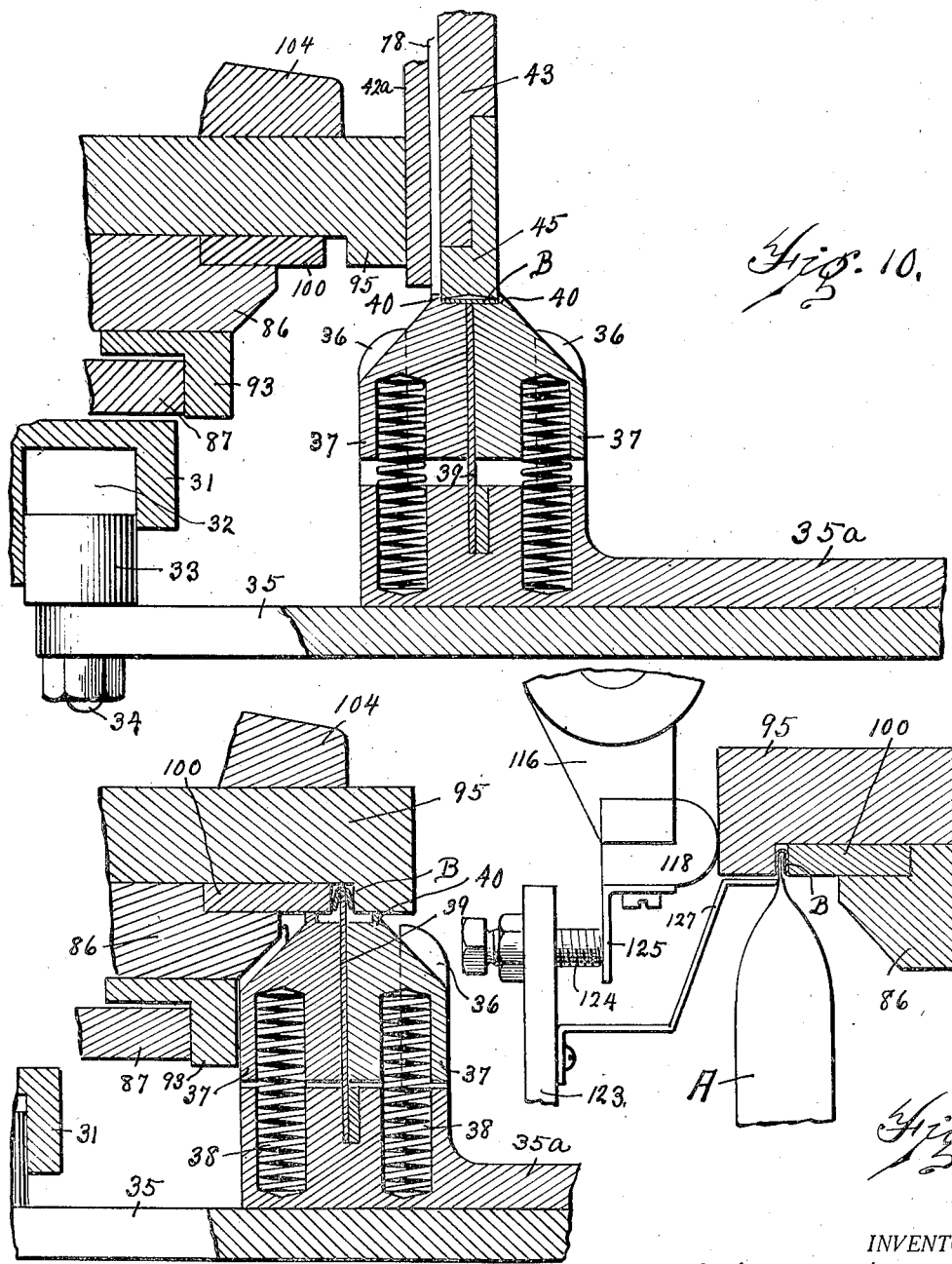

Patented Mar. 9, 1926.

1,576,480

UNITED STATES PATENT OFFICE.

ALFRED W. KATH, OF DETROIT, MICHIGAN, ASSIGNOR TO ARTHUR COLTON COMPANY, OF DETROIT, MICHIGAN, A CORPORATION OF MICHIGAN.

CLIP-ATTACHING MACHINE.

Application filed September 19, 1924. Serial No. 738,655.

*To all whom it may concern:*

Be it known that I, ALFRED W. KATH, a citizen of the United States, and residing at Detroit, in the county of Wayne and State of Michigan, have invented a new and Improved Clip-Attaching Machine, of which the following is a specification.

This invention relates to means for cutting a strip of sheet metal into short blanks, folding these blanks into V-shaped clips and then closing the clips over the folded ends of metal container tubes adapted to hold tooth and shaving pastes, oil colors and the like; and its object is to produce a machine of this character which shall be automatic in its action, which shall be strong and long lived, and which will not readily get out of order.

This invention consists in a machine embodying clip-blank shearing and folding devices, intermittently rotatable means for carrying the clips to the tubes to which the clips are to be attached, and means to close the folded clips onto the ends of the tubes.

It also consists in a rotatable turret embodying a series of pairs of jaws and a blade to force clip-blanks into the spaces between the jaws and thereby producing the clips which are retained between the jaws by their own resilience, means to intermittently rotate the turret to carry the jaws and the clips between them to the previously filled container tubes and then placing the clips over the flattened ends of the tubes, and means for closing the jaws to pinch the clips onto the tube ends.

It further consists in the details of construction illustrated in the accompanying drawing and particularly pointed out in the claims.

Figure 1:
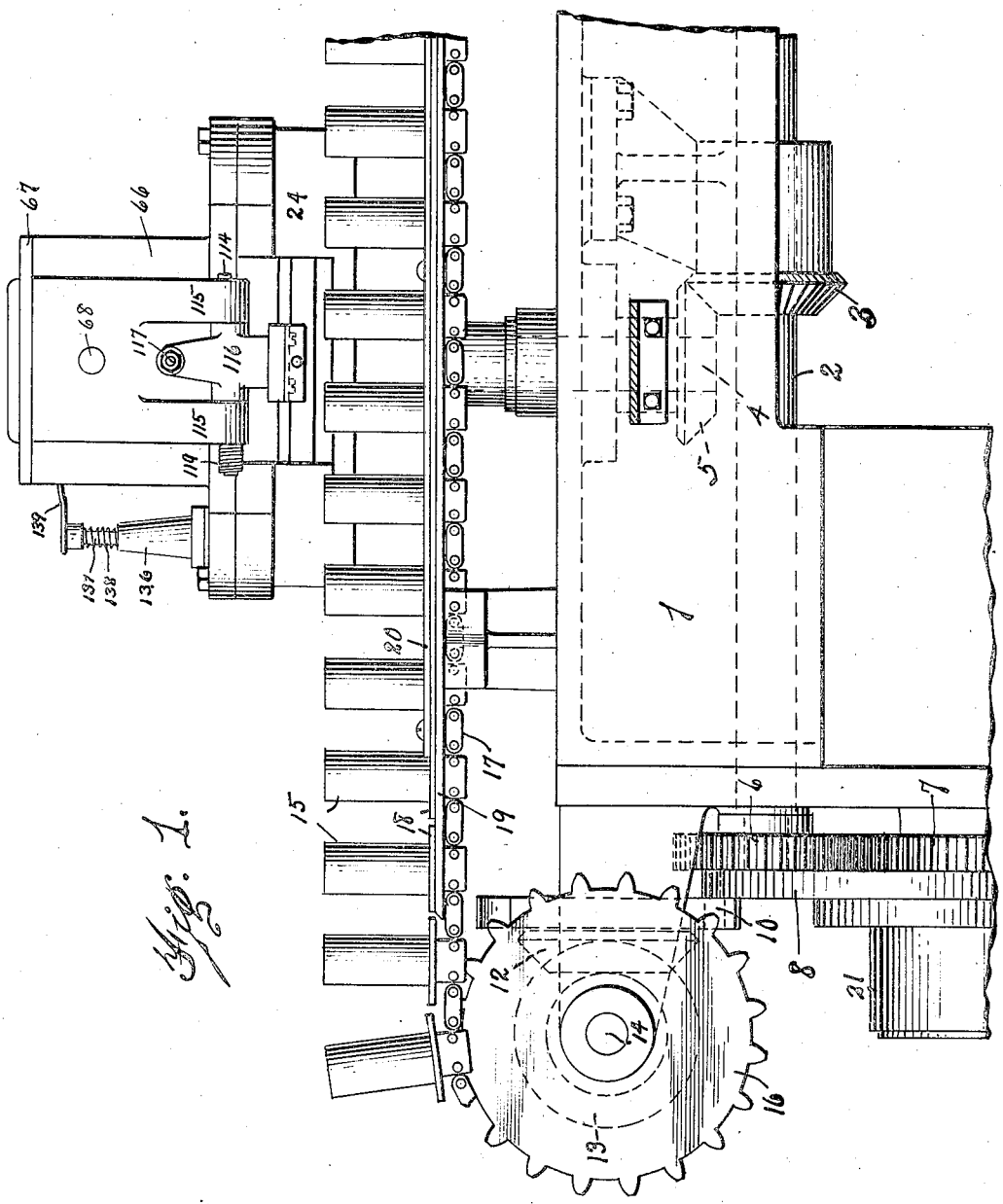
Figure 2:
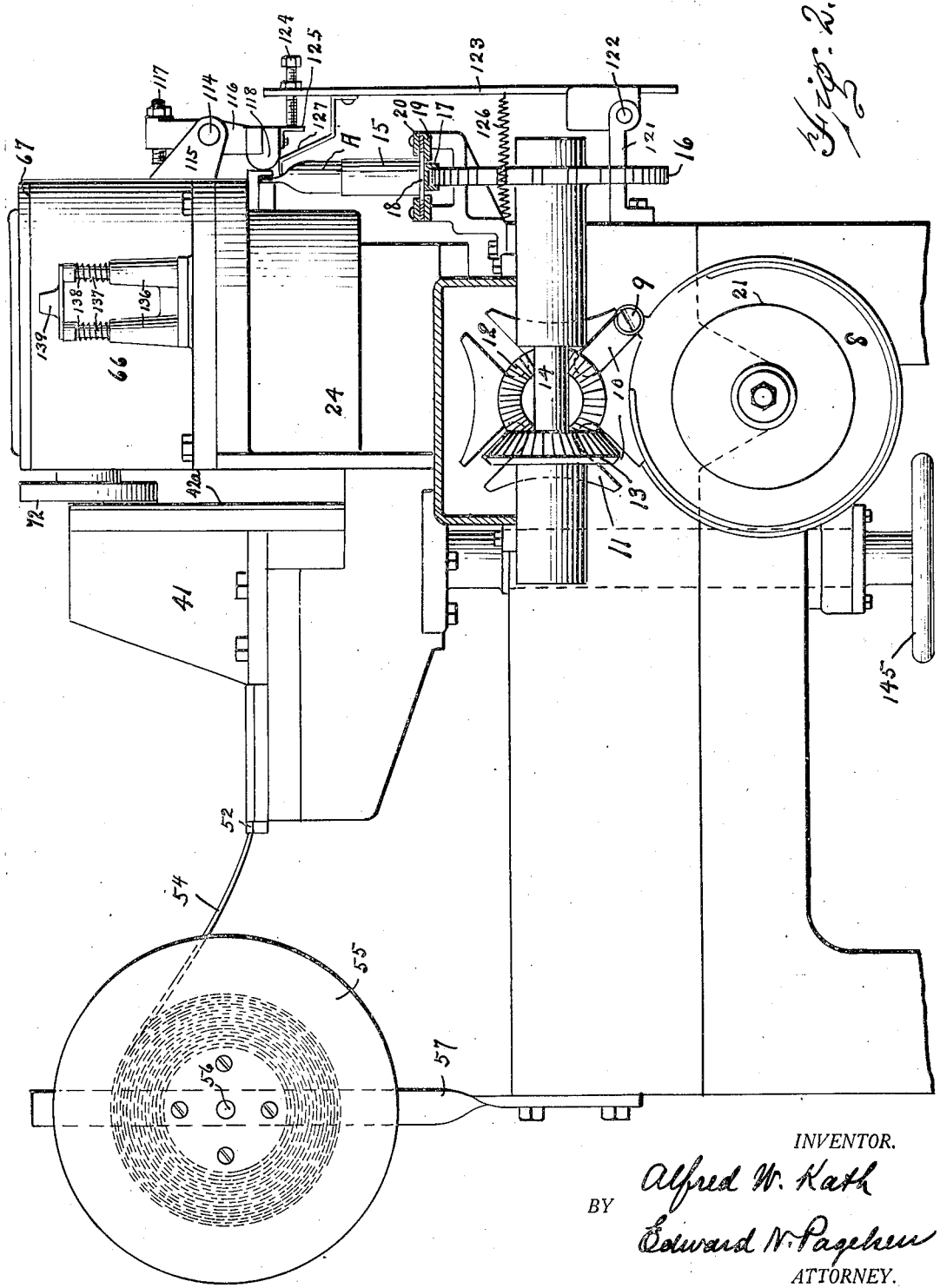
Figures 3, 4:
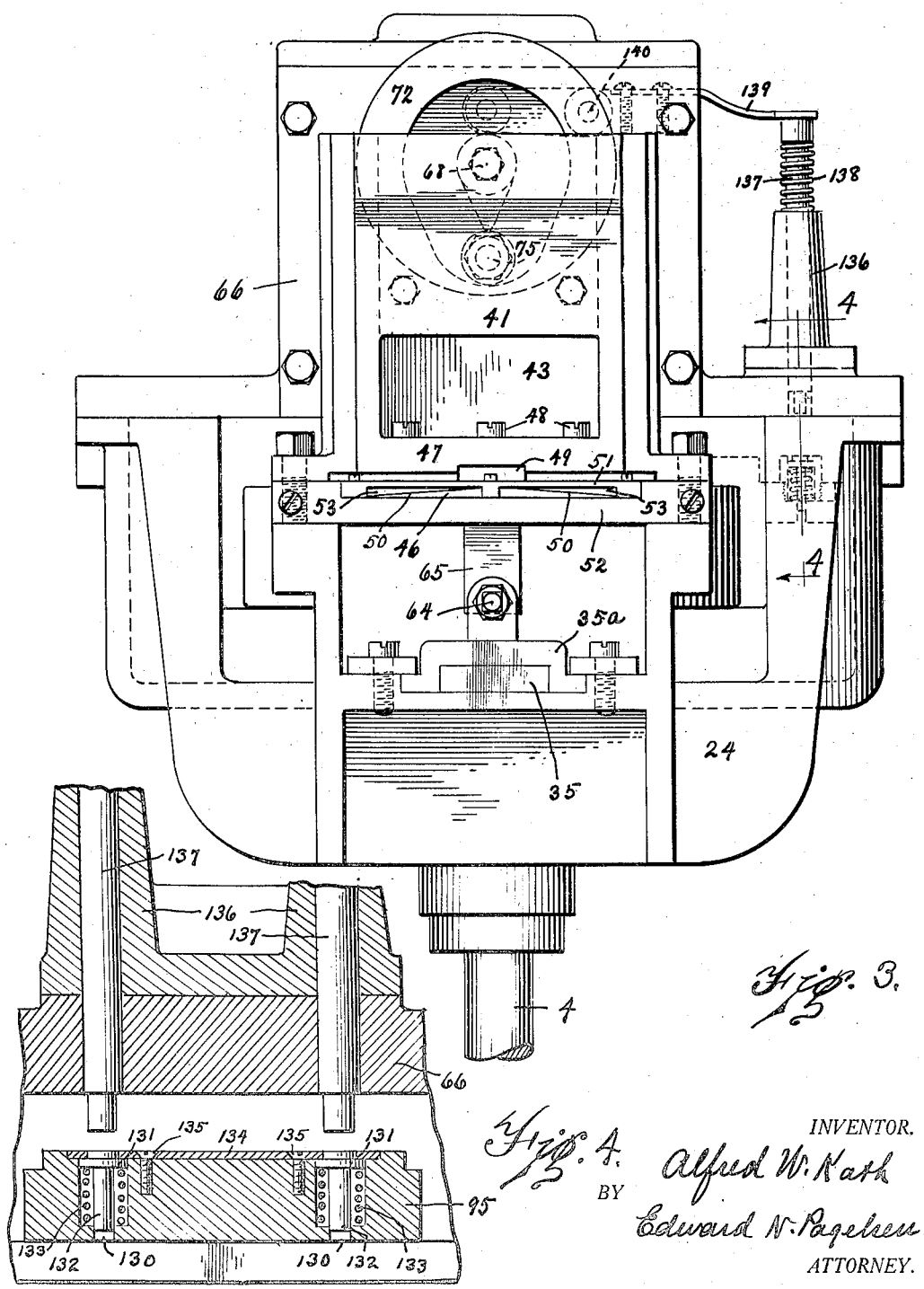
Figure 5:
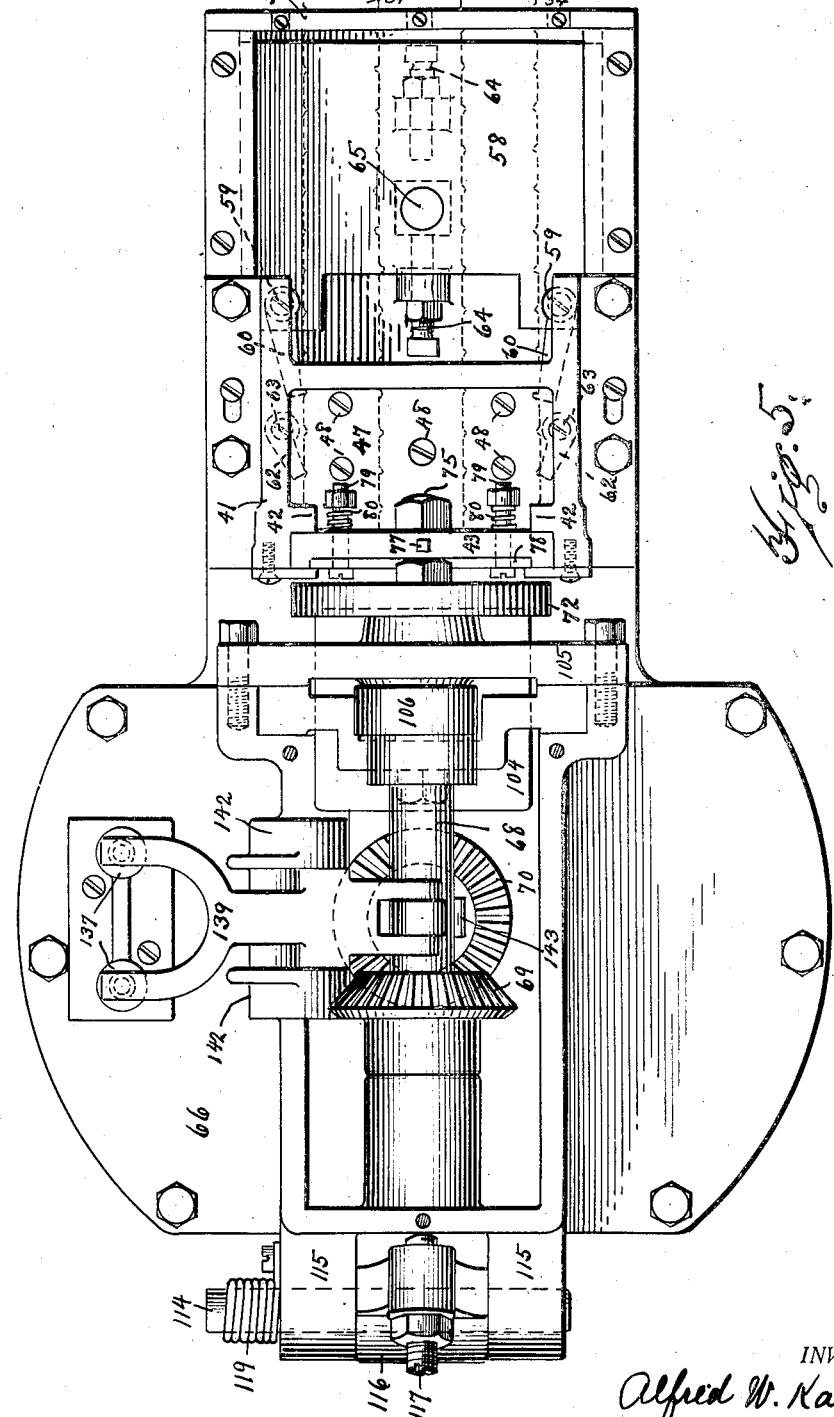
Figure 6:
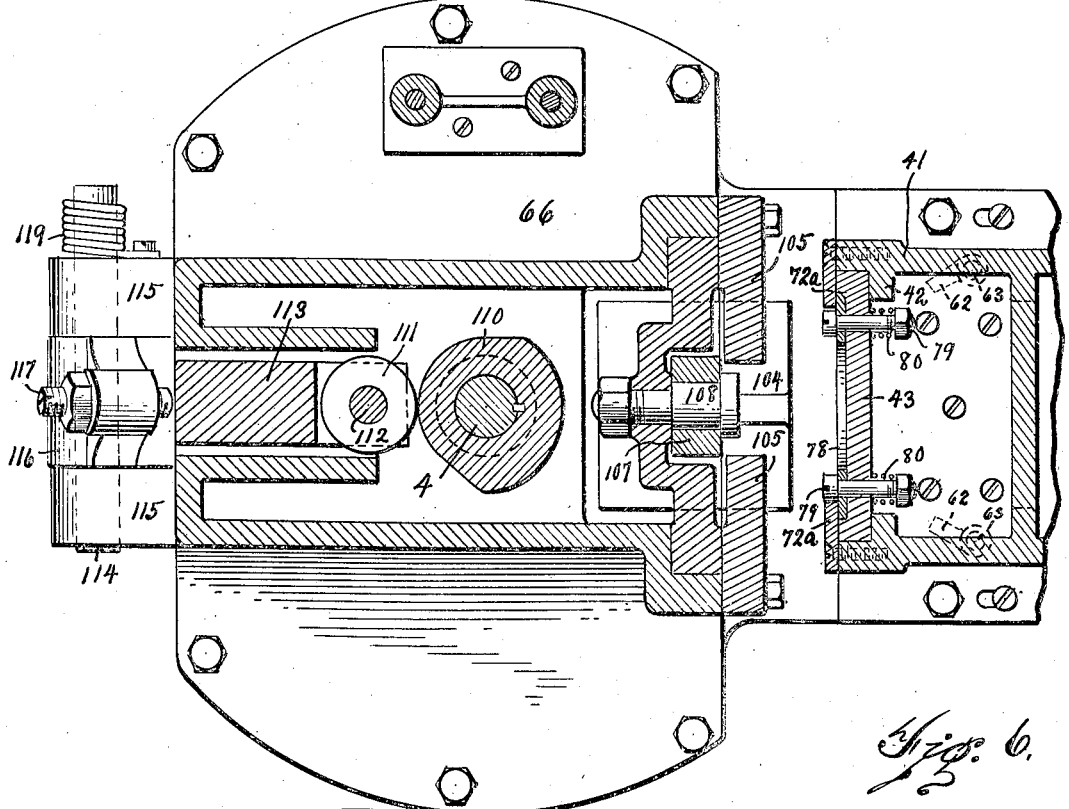
Figure 7:
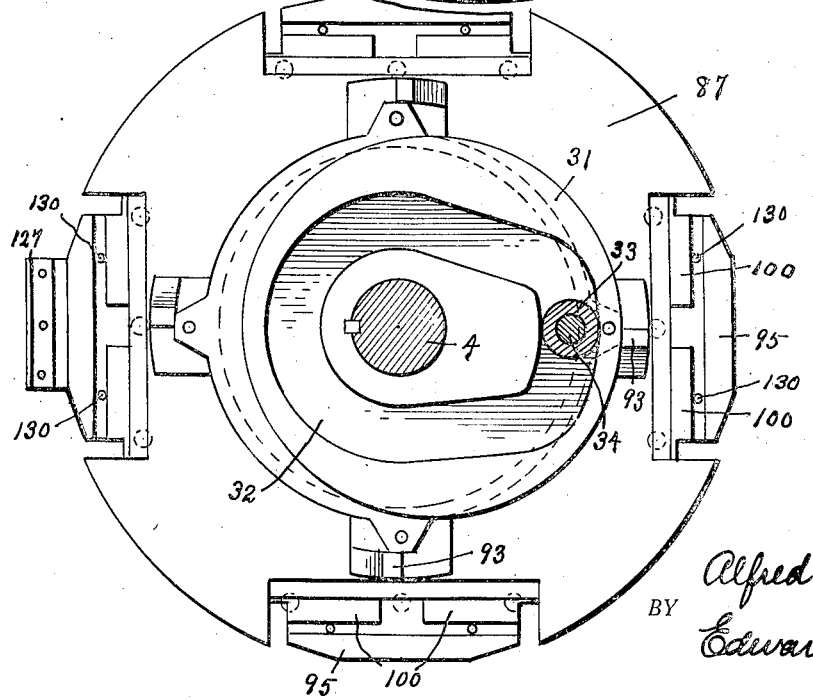

In the drawings, Fig. 1 is a front elevation of a clip-attaching machine embodying my present invention. Fig. 2 is an end elevation thereof. Fig. 3 is a rear elevation of the clip-forming and attaching mechanism on a larger scale. Fig. 4 is a section on the line 4—4 of Fig. 3. Fig. 5 is a plan of this mechanism with the cap of the upper housing removed. Figs. 6 and 7 are sections on the lines 6—6 and 7—7 of Fig. 8. Fig. 8 is a central vertical section of this mechanism. Fig. 9 is a radial section of a portion of the turret at an angle of 45 degrees to the plane of Fig. 8. Fig. 10 is a section parallel to the plane of Fig. 8 of the blank receivers. Fig. 11 is a similar section showing the action of the folding devices. Fig. 12 is a view showing how the clips are attached to the ends of the tubes.

Similar reference characters refer to like parts throughout the several views.

The present machine embodies mechanism to feed a strip of metal formed with evenly spaced notches along both its edges to a shear; mechanism to sever the strip, bend the clip-blanks to V-shape; and mechanism to carry the severed and bent blanks to proper position to apply them to the closed ends of pliable container tubes and there close them onto such ends. It may also embody means for removing such blanks as have not been used from the carrying mechanism. All this mechanism is actuated in proper sequence by means mounted adjacent a conveyor for the tubes and this conveyor may be of any desired construction, but one which will carry the filled tubes in pairs from the filling and closing machines to this clip-attaching mechanism is preferred.

The tube carrier.

Fig. 1 shows a frame 1 which carries a line shaft 2 extending to the filling and closing devices and having a bevel gear 3 to drive the vertical shaft 4 of the present clip-attaching machine by means of the bevel gear 5. A pinion 6 on this shaft meshes with a gear 7 attached to the disk 8 which carries a pin 9 adapted to enter the slots 10 of the star wheel 11 which completes a Geneva movement. A bevel gear 12 attached to this star wheel meshes with a gear 13 on the shaft 14, and this shaft carries the sprocket wheel 16 for the chain 17. Attached to this chain are cylindrical holders 15 for the filled tubes A, each holder being preferably attached to a base 18 which slides between the bottom plates 19 and the gibs 20. Pairs of these tubes A stop at the clip-attaching mechanism for practically fivesixths of the rotation of the pin-disk 8, during which time the clips are attached. The mechanism may be driven by a belt on the pulley 21.

As shown in Figs. 1 and 12, the tubes A reach this machine in pairs with their upper ends closed by being flattened and then bent over. The problem is to form and attach a V-shaped clip to each of these tubes while it is at rest.

The shearing mechanism.

The lower housing 24 is mounted in the frame 1 and carries the vertical turret shaft 4 which drives the various mechanisms for shearing, folding and attaching the clips. On this shaft 4 and rotatable therewith is a sleeve 26 which has a projecting pin 27 carrying a roller 28 that rides on the stationary cam 29 whereby the sleeve 26 and the parts carried thereby are caused to move up and down. The use of this cam will be explained later on. Attached to this sleeve is a carrier cam 31 having a cam groove 32 which receives the roller 33 on the pin 34 attached to the carrier actuator 35 which is a flat plate slidable in a groove in the lower housing. The groove 32 is so deep that the cam can be moved up and down without disengaging the roller 33. The carrier 35ª has pairs of upwardly projecting guide pins 36 at its inner end between which the blank holders 37 are positioned, these holders being supported by springs 38. These holders are long enough to receive two blanks B and are separated by the folder plate 39. See Figs. 10 and 11. Each holder has a small rib 40 to position the blanks.

The lower housing supports a shear frame 41 which is formed with vertical guides 42 and 42ª for the shear slide 43. The shear 45 is attached to this slide and co-acts with the stationary shear plate 46. See Fig. 8. This shear frame has a cross bar 47 which carries screws 48 which secure the shear plate 46 and a guide block 49 in position. The upper surface of the shear plate slopes down in both directions so that its cutting edges 50 (Fig. 3) are inclined to the straight lower edges of the shear 45.

A cross-bar 52 extends across the rear end of the lower housing and to it is attached a guide bar 51 which leaves the slots 53 for the entrance of the stock for the blanks. This stock is received in the form of ribbons 54 from any desired source of supply, preferably from reels 55, supported on a shaft 56 carried by brackets 57 extending up from the base 1. See Fig. 2. These ribbons are fed along by the feed plate 58 slidable just above the carrier plate and the screws 59 on this feed plate support the dogs 60 which engage notches in the edges of these ribbons as indicated in Fig. 5. Stop dogs 62 are mounted on screws 63 carried by the shear plate 46 and these dogs are all spring-pressed in the usual manner.

The feed plate is moved back and forth a distance slightly greater than the width of a blank by means of the adjustable screws 64 carried by the actuator, which screws engage the post 65 extending down from the feed plate 58. The actuator moves a greater distance than the feed plate as it must carry the blanks from the shear to the folder.

An upper housing 66 is attached to the lower housing and a removable cap 67 permits inspection of the mechanism. A cam shaft 68 is driven by the turret shaft 4 through the mitre gears 69 and 70 and carries the shear cam 72 formed with a cam groove 73 to receive the roller 74 on the pin 75 attached to the shear slide 43. This pin may be raised or lowered in the slot 76 by means of a screw 77 to provide for wear of the shear 45.

The blanks B are prevented from snapping away by means of a stop-plate 78 loosely attached to the shear plate by the screws 79 and the springs 80, passing through short slots in this stop-plate so that it normally extends down below the lower edge of the shear member 45. The operation of this mechanism is simple. The ribbons 54 are fed forward at each rotation of the turret shaft and the shear cuts off a pair of blanks and these blanks rest on the holders between the ribs 40, as shown in Fig. 10. They are then moved by the holders into position under one of the folders while the feed plate moves the ribbons inwardly the width of a blank.

The turret.

Attached to the sleeve 26, which is slidable upon and rotatable with the turret shaft 4, is a circular disk 85 which rotates continuously, and it is secured between the upper member 86 and the lower member 87 of the turret by the screws 88 shown in Fig. 9, which members are pressed toward this disk by the springs 89. Rings 90 of leather are the actual contact members between this disk and the turret and permit sliding movement when the turret is stopped by the arm 92 extending up from the lower housing at the front of the machine and one of the dogs 93 attached to the lower side of the turret.

The folders.

Guide sectors 94 are secured to the top of the turret and between them the movable upper folder jaws 95 are radially slidable. The outward movement of these jaws is limited by screws 96 and they are positioned by pairs of parallel bars 97 extending from the hub 98 of this upper member. Springs 99 normally hold these folder jaws outward. Pairs of complementary stationary jaws 100 are attached to the member 86.

The roller 28 rides on the short highest portion 100 of the cam 29 to lift the dogs 93 out of engagement with the arm 92 and then drops to the portion 101 to again bring these dogs into the plane of this arm which causes the folders to stop in alinement with the holders 37 which have already received two blanks B as shown in Fig. 10. Continued rotation of the cam 31 brings the roller 33 to the inner concentric portion of the groove 32 (Fig. 7) which moves the holders and blanks under the folders. When the roller 28 reaches the lowest portion 102 of the cam 29, the folders are brought down as shown in Fig. 11, forcing down the holders 37 so that the blade 39 can push the blanks up between the folders. The roller 28 now rides up onto the step 100 and lifts the folders off the blade 39, the folded clips retaining themselves between the folders by their own resilience. The turret is also released and makes a one-fourth rotation.

I prefer to insure the downward movement of the folders by means of a presser foot 104 which is guided between the parts 105 of constituting portions of the upper housing, this foot being slidable on the upper portion of the turret. A cam 106 on the cam shaft 68 engages a roller 107 on the pin 108 carried by this presser foot and forces this foot down at the correct time to fold the clips below it. Before the roller 28 reaches the high point 100 of the cam 29 the folders are lifted sufficiently to permit the holders to move back to receive two other blanks.

The closing mechanism.

The folders just opposite to those being loaded are just above the upper ends of a pair of tubes H and when the roller 28 drops down to the low dwell 102 are lowered down to the position shown in Fig. 12. A cam 110 on the turret shaft engages a roller 111 carried by the pin 112 (Fig. 6) of the folder-closing push rod 113. A pin 114 in the brackets 115 carries a rocker 116 having an adjustable screw 117 at its upper end and a knob 118 at its lower end. The cam 110 is so timed that this knob 118 presses the upper folder jaw 95 inward at the exact time that the folder has reached the lower limit of its movement as shown in Fig. 12. A spring 119, (Fig. 6) normally holds the rocker in the position shown in Fig. 8.

In order to position the upper ends of the tubes A, a bracket 121 (Fig. 2) may be attached to the base 1 to carry a pin 122 on which the arm 123 is mounted. A screw 124 at the upper end of this arm contacts with the bracket 125 on the lower end of the rocker 116 and the spring 126 pulls this screw against this bracket. A blade 127 attached to this arm contacts with the upper ends of the pair of tubes under the folders and the clips supported thereby and holds these tubes in proper position to receive the clips.

After the clips have been attached the rocker swings back to permit the folders to separate and the tubes are moved along just as the turret begins its next quarter turn.

The safety device.

If no tube is present between the folder jaws at the time they are forced together by the rocker 116, the clip may spring open because of the resilience of the metal so as to hold itself between the jaws and be carried around back to the shearing mechanism where a second blank would be forced up between the folded jaws into the space already occupied. This might result in a disabled machine. To prevent this the upper movable folder members are formed with small holes 130 just above the spaces between the stationary and movable jaws and in alinement with the spaces for the clips as shown in Fig. 4. These holes are counter-bored to receive the heads 131 of the pins 132 and the springs 133 which abut against the plate 134 secured to the folder member 95 by means of screws 135.

A pair of guides 136 are mounted on the upper housing 66 and the pins 137 are slidable therein. These pins are pressed upward by the springs 138 but are pressed down at each stoppage of the turret by the lever 139 which is pivoted on the pin 140 carried by the brackets 142. A cam 143 on the cam shaft 68 engages the inner end of this lever and forces down the pins 137 to engage the pins 132 which force any clips that may have been carried around out of the spaces between the folder jaws. It is evident that the pins 132 might be omitted and that the pins 137 might be given sufficient movement to accomplish this purpose, but the high speed of this machine renders the present structure advisable as these parts accomplish their purpose in a minimum of time.

Where this clipping mechanism is to be used for tubes of different lengths the housings may be raised and lowered relative to the tubes by means of a handwheel 145 shown in Fig. 2, but the mechanisms for this purpose are so well known that none is here illustrated.

The details and proportions of this clipping mechanism may all be changed by those skilled in the art without departing from the spirit of my invention as set forth in the following claims.

I claim:—

1. In a clip attaching machine, means embodying a pair of jaws to fold a clip-blank to V-shape and to carry it to position over the closed end of a container tube, and means to force the jaws together to secure the clip onto the end of the tube.

2. In a clip attaching machine, rotatable means embodying a pair of jaws to fold a clip-blank to V-shape, rotatable means to support and carry the jaws and clip to position over the closed end of a container tube, means to force the jaws together to secure the clip onto the end of the tube, and an actuating device to intermittently rotate said jaw support.

3. In a clip attaching machine, means to feed a strip of metal into the machine, means to shear the strip into clip-blanks, means to press the blanks into the space between a pair of jaws and thereby fold the blank to V-shape, means to carry the jaws and clip to position over the closed end of a container tube, and means to force the jaws together to secure the clip onto the end of the tube.

4. In a clip attaching machine, means to intermittently feed a strip of metal into the machine, a vertically movable shear blade to cut the strip into clip-blanks, a carrier to receive the blanks, a vertically movable pair of jaws and a plate adapted to fold the blank to V-shape and force it into the space between the jaws, means to carry the jaws and clip to position over the closed end of a container tube, and means to force the jaws together to secure the clip onto the end of the tube.

5. In a clip attaching machine, a rotatable turret and means to move it up and down, means to shear a strip of metal into blanks, means embodying a pair of jaws on the turret and a stationary plate to fold a clip-blank into V-shape, means to rotate the turret to carry the jaws and the clip to position over the closed end of a container tube, and means to force the jaws together to secure the clip onto the end of the tube.

6. In a clip attaching machine, a rotatable turret and means to move it up and down, means to shear a strip of metal into blanks, means embodying a pair of jaws mounted on the turret and a stationary plate to fold a clip-blank into V-shape, means to rotate the turret to carry the jaws and the clip to position over the closed end of a container tube, and means to force the jaws together to secure the clip onto the end of the tube end comprising a vertical shaft on which a turret is mounted and a cam on said shaft.

7. In a clip attaching machine, rotatable means embodying a vertical shaft and a sleeve slidable thereon, a pair of jaws supported by said sleeve and a stationary plate to fold a clip-blank to V-shape, means to rotate said sleeve to carry it and the clip to position over the closed end of a container tube, a circular cam to lift the sleeve up and down as it rotates, means to force the jaws together to secure the clip onto the end of the tube, and an actuating device to intermittently rotate the sleeve and shaft.

8. In a clip attaching machine, a vertical rotating shaft and a circular disk mounted thereon, a rotatable turret embodying friction means engaging the disk to cause the turret to turn with the disk, stop devices for the turret, means to elevate the turret at intervals to disengage said stop devices, means to shear a strip of metal into blanks, means embodying a pair of jaws on the turret and a stationary plate to fold the clip blanks into V-shape, said jaws and blanks being carried by the turret to proper position over the closed ends of container tubes and then lowered to apply the clips to the tubes, and means to force the jaws together to secure the clips onto the ends of the tubes.

9. In a clip attaching machine, a rotatable turret and means to move it up and down, a carrier plate movable radially in and out relative to the turret, feeding means actuated by the plate to feed a strip of metal toward the turret, means to shear the strip of metal into clip-blanks, a holder mounted on the carrier plate to receive the blanks comprising a pair of spring supported members and a plane between them, said holder adapted to be moved inward after receiving the blanks, a pair of jaws mounted on the turret and adapted to be lowered onto the holder to depress the supporting members to allow the plate to force the clip-blank into the space between the jaws to fold it into V-shape, means to intermittently rotate the turret to carry the jaws and the clip to position over the closed end of a container tube, and means to force the jaws together to secure the clip onto the end of the tube.

10. In a clip attaching machine, a housing means mounted thereon embodying a pair of jaws and a plate to fold a clip-blank to V-shape and to carry it to position over the closed end of a container tube, means to force the jaws together to secure the clip onto the end of the tube, and means to remove from between the jaws such clips as are not attached to tube ends.

11. In a clip attaching machine, a housing means mounted thereon embodying a pair of jaws and a plate to fold a clip-blank to V-shape and to carry it to position over the closed end of a container tube, means to force the jaws together to secure the clip onto the end of the tube, and means to remove from between the jaws such clips as are not attached to tube ends comprising vertically slidable spring-held pins mounted in the upper jaw and slidable in holes therein in alinement with the space between the jaws, a pair of spring-held pins mounted on a stationary part of the housing, and means to intermittently actuate the last named pins.

12. In a clip attaching machine, a housing, a shearing mechanism therein to cut a strip of metal into clip-blanks, a feed plate on which said strip is fed to the shearing mechanism, dogs mounted on the feed plate and engaging notches in the edges of the strip to feed the strip, stationary dogs engaging in said notches to prevent backward movement of the strip, a pair of jaws to receive the blanks, means co-operative with the jaws to fold the blanks into V-shaped clips, means to carry the jaws and clips to position over the closed end of a container tube, and means to force the jaws together to secure the clip onto the end of the tube.

ALFRED W. KATH.